United States Patent [19]
Morris et al.

[11] Patent Number: 6,085,304
[45] Date of Patent: Jul. 4, 2000

[54] INTERFACE FOR PROCESSING ELEMENT ARRAY

[75] Inventors: Carl Morris, Orlando; Kevin Dennis, Oviedo, both of Fla.

[73] Assignee: TeraNex, Inc., Orlando, Fla.

[21] Appl. No.: 08/980,338

[22] Filed: Nov. 28, 1997

[51] Int. Cl.$^7$ .......................... H04N 5/335; G06F 9/345
[52] U.S. Cl. .................. 712/22; 712/16; 712/18; 712/11; 345/100
[58] Field of Search ...................... 345/418, 100; 365/258, 183; 708/520; 350/440; 370/389; 712/2, 18, 3, 16, 4, 14, 42, 201, 22, 11, 5, 6; 700/259

[56] References Cited

U.S. PATENT DOCUMENTS

| | | | |
|---|---|---|---|
| 4,873,630 | 10/1989 | Rusterholz et al. | 712/3 |
| 5,101,371 | 3/1992 | Iobst | 708/520 |
| 5,280,474 | 1/1994 | Nickolls et al. | 370/389 |
| 5,581,773 | 12/1996 | Glover | 712/14 |
| 5,606,707 | 2/1997 | Tomassi et al. | 345/418 |

*Primary Examiner*—Daniel H. Pan
*Attorney, Agent, or Firm*—Burns, Doane, Swecker & Mathis, LLP

[57] ABSTRACT

A memory-like I/O system is provided for interfacing a processing element array with a host system. The I/O system includes cornerturn logic for converting data written to the processing element array from horizontal format to vertical format and for converting data read from the processing element array from vertical format to horizontal format. Addressable interface memory is provided and includes a first bank for receiving and storing data which has been output from the cornerturn logic and for outputting that data for delivery to the processing element array. The addressable interface memory includes a second bank for receiving and storing data which has been output from the processing element array and for outputting that data for delivery to the cornerturn logic. The interface of the invention can provide support for concurrent I/O and processing, thereby allowing processing and I/O operations to proceed in parallel. The memory used to implement the interface can be used for on-chip paging to significantly reduce or eliminate the need for the slower and more costly off-chip paging.

15 Claims, 3 Drawing Sheets

INTERFACE FOR PROCESSING ELEMENT ARRAY

BACKGROUND OF THE INVENTION

1. Field of the Invention

The invention relates in general to the field of processors having multiple processing elements, and in particular to an improved interface for providing input/output operations in such processors.

2. Related Art

Single Instruction Multiple Data (SIMD) processors have been known for use in applications such as image processing. SIMD processors have a number of individual Processing Elements (PE's) which each execute the same instruction upon different data. Systems which incorporate SIMD processors implement an Input/Output (I/O) architecture which allows them to move data to and from the PE's.

The prior art includes SIMD processors having an array of bit-serial PE's connected in a grid fashion, with working memory on-chip. The design of the PE's is often kept simple in order to maximize the number of them that can be placed on a chip. This simplicity allows systems incorporating such chips to achieve high PE densities, but requires systems to surround the chips with resources dedicated to support of their simple I/O architecture.

Such chips of the prior art often support I/O operations with the outside world through a communications bus. This bus consists of a unique data transmission path for each column of PE's in an array (an array can consist of a single chip, or multiple chips connected together). Thus, an array with X columns and Y rows of PE's would have a communications bus with a total of X paths.

The PE's of such prior art chips each ordinarily have a communications register which they can read and write. Shift operations cause the contents of each PE's communication register to move along the communications bus to the communications register of the PE above it. Each path in the communications bus can transmit a single bit of data at a time. Data is loaded into the array at the bottom edge one row at a time, while data is unloaded from the array at the top edge one row at a time.

For an array with X columns and Y rows a total of Y shifts of the communications bus are required to load or unload a single bit of data from all PE's in the array. If an input or output consists of N bits of data for each PE, a total of Y*N shifts are required. The natural format of data for I/O operations with prior art arrays is in bitplanes (i.e. bit zero of the entire image, followed by bit one of the image, etc.) supplied one row at a time.

Prior art SIMD arrays process and communicate data most naturally in bitplanes, but the systems which incorporate such arrays often process and communicate data most naturally in pixel format (i.e. all bits of a pixel grouped together). This mismatch requires additional hardware and/or software to implement the interface between an array and the system in which it resides.

When data is ready for processing in a bit-serial SIMD array all bits associated with a pixel are stored in the memory of a single PE. The bits of the pixel can be viewed as being stacked one on top of another in the PE's memory; this format has accordingly been known as "vertical format."

If pixel format data were shifted into an array with no preprocessing the bits associated with the pixel would be distributed across several PE's in a row-wise direction (because the array shifts data in a row at a time). The bits of the pixel can be viewed as being side-by-side in the memory of several PE's, and therefore this format has been known as "horizontal format."

The process of converting data from horizontal format to vertical format or vice versa is known as "cornerturning." Systems which incorporate a PE array ordinarily cornerturn inputs to the array before they can be processed, and cornerturn outputs from the array before they can be used by the system. Heretofore, approaches to cornerturning involve the use of hardware external to the array to accomplish a portion of the cornerturning process, and software within the array to accomplish the rest.

There are a number of drawbacks to prior art approaches to SIMD processor I/O. Typical systems which incorporate PE arrays have one or more of the following components which exist solely for the purposes of interfacing with the array: input staging memory, input fifo, recirculation fifo, output fifo, paging buffer, output staging memory, and address generator. These interface components add complexity to the system design and negatively impact such critical system factors as power consumption, heat production, weight, and size. For small arrays, the amount of board space required for interface components can exceed the space required for SIMD processor chips.

Other approaches to solving the interface problem involve less hardware and more software, or more hardware and less software. Approaches which rely more on hardware add components and complexity at the system design level, while providing minimal gains in performance. Approaches which rely more on software often cannot eliminate the majority of interface components, and suffer from setbacks in system performance.

In addition to the interface problems discussed above, SIMD processors of the prior art face limitations regarding their paging buffers. Paging buffers are memory components external to the array which are used to store temporarily the results of intermediate calculations when PE working memory runs low. Use of this memory is called "off-chip paging." Off-chip paging has significant performance penalties because the bandwidth between the array and the paging buffers is slow when compared with the bandwidth between the array and its working memory. Bandwidth rates can easily differ by more than two orders of magnitude, which translates into a tremendous penalty for off-chip paging.

OBJECTS AND SUMMARY OF THE INVENTION

It is therefore an object of the invention to provide an improved interface for a multiple-processing-element processor.

It is a further object of the invention to simplify access to a multiple-processing-element processor.

It is a further object of the invention to provide a processor interface which provides a reduction in the complexity and/or board space requirements of multiple-processing-element processors in applications such as image processing systems.

It is a further object of the invention to provide a multiple-processing-element processor having improved paging capabilities.

In a preferred embodiment, the invention provides a SIMD processor with a memory-like interface having a reduced number of necessary interface components and integral cornerturning. Cornerturn logic is provided for converting data written to the processing element array from horizontal format to vertical (bitplane) format and for converting data read from said processing element array from vertical format to horizontal format. Addressable interface memory is provided and includes a first bank for receiving and storing data which has been output from the cornerturn logic and for outputting that data for delivery to the processing element array. The addressable interface memory includes a second bank of memory for receiving and storing data which has been output from the processing element array and outputting that data for delivery to the cornerturn logic.

In addition to a reduced and simplified interface, the invention can provide support for concurrent I/O and processing, thereby allowing processing and I/O operations to proceed in parallel. The memory used to implement the interface can be used for on-chip paging to significantly reduce or eliminate the need for the slower and more costly offchip paging.

BRIEF DESCRIPTION OF THE DRAWINGS

The foregoing and other objects, features, and advantages of the invention will be apparent from the following more particular description of preferred embodiments as illustrated in the accompanying drawings, in which reference characters refer to the same parts throughout the various views. The drawings are not necessarily to scale, emphasis instead being placed upon illustrating principles of the invention.

DETAILED DESCRIPTION

By treating the PE array as if it were a bank of memory, some or all interface components such as staging memories, fifos, and output buffer surrounding the array can be eliminated. By thusly reducing and simplifying the interface to a multiprocessor array one can reduce the complexity and board space requirements of systems which use such arrays, such as image-processing systems. This reduced interface is referred-to hereinafter as the "World Interface" (WI).

Figure 1:
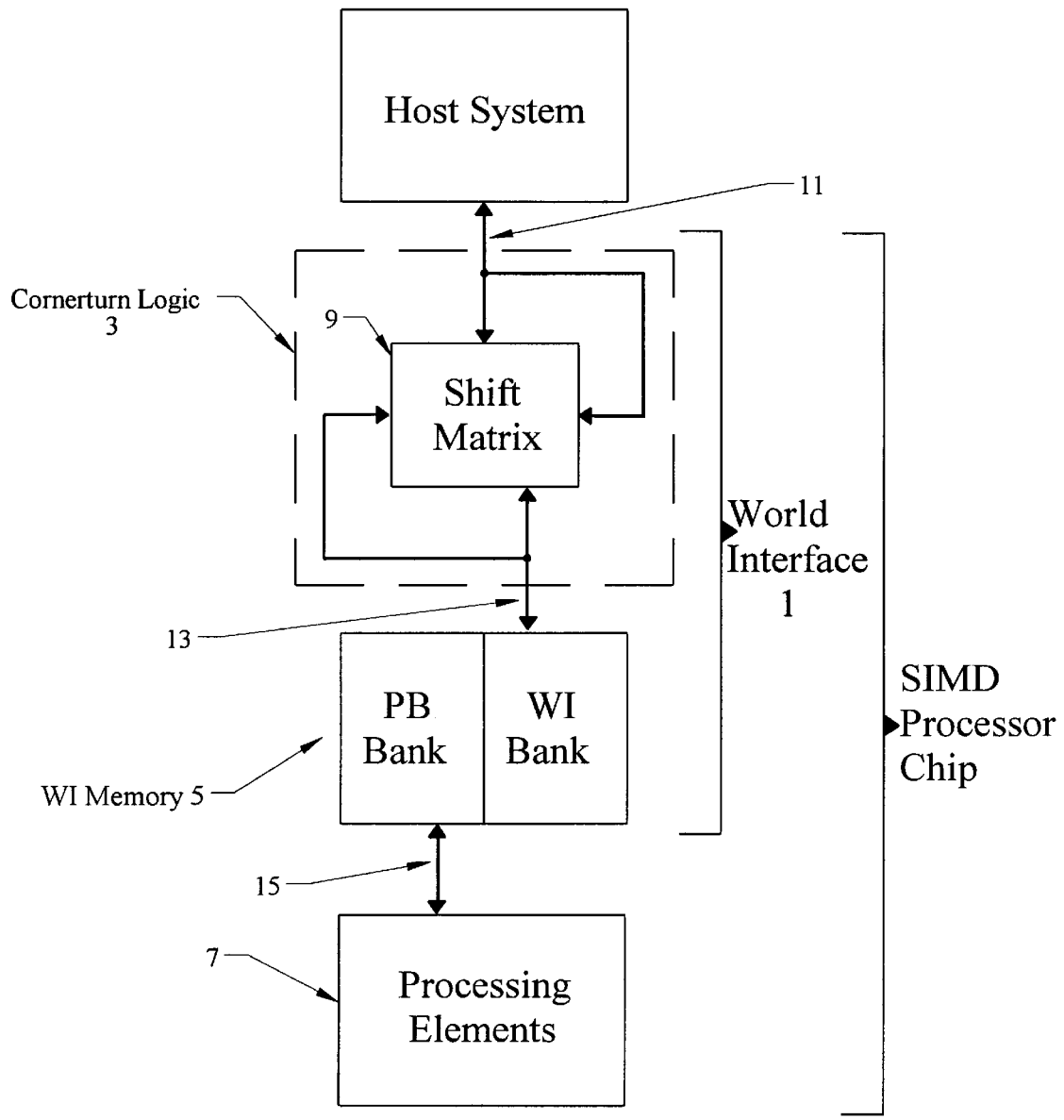
FIG. 1 shows a schematic block diagram illustrating features of the invention according to a preferred embodiment.

FIG. 1 shows a block diagram illustrating the invention according to a preferred embodiment. The world interface 1 comprises cornerturn logic 3 and WI memory 5.

Cornerturn logic 3 is used to sequentially read and write the paging memory associated with each one of a series of PE's 7 on a row-by-row basis. The cornerturn logic 3 handles conversion of data between host system and chip formats as data is read from or written to the chip.

The WI memory 5 is used as a source or destination for I/O operations with the host system, and can also support on-chip paging. On-chip paging is significantly faster than off-chip paging because all PE's can be loaded or unloaded simultaneously, and may eliminate the need for external paging buffers.

Figure 1A:
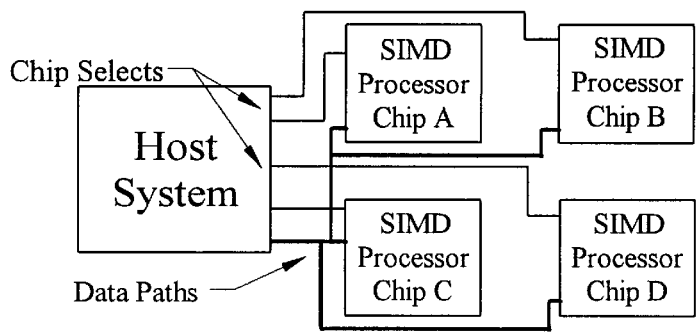
FIG. 1a shows a schematic block diagram illustrating a 2×2 array of SIMD processor chips of the invention.

A single SIMD processor chip is depicted in FIG. 1. Systems normally contain a number of chips arranged to form a rectangular array. FIG. 1a shows an example of a 2×2 array of SIMD processor chips of the invention, but other arrays (3×3, 4×6, etc.) can be used as necessary for a particular application.

When multiple chips are used each is connected to the host system through one or more busses. Individual chips are selected for operations through use of chip select logic integral to the world interface 1.

In the following description a data path width of 32 bits is assumed. This means that up to 32 bits can be moved to or from the WI in a single operation. And, the dimensions of the array of PE's on the chip are 32 rows by 32 columns. Those skilled in the art will recognize that other data path widths and array dimensions are possible without departing from the spirit and scope of the invention.

Data stored in WI memory 5 is normally in the native bitplane format of the PE's. All data which enters or leaves the chip passes through the cornerturn logic 3 which performs the appropriate data conversions to and from the host system format.

The cornerturn logic 3 preferably comprises a shift matrix 9, I/O muxes, and counters.

The shift matrix 9 preferably comprises a 32-by-32 matrix of shift registers 9 which can move data in both directions horizontally and both directions vertically. I/O muxes provide the ability to transfer data to and from the shift matrix along either axis. The counters generate WI memory addresses as data is moved to or from the shift matrix.

Data paths 11 leading to the host system are connected to one vertical and one horizontal edge of the shift matrix 9. Data paths 13 leading to the WI memory 5 associated with each row of PE's are connected to the other vertical and horizontal edges of the matrix.

During writes to the chip, data will move from one of the host system edges to the opposite WI memory edge. During reads from the chip, data will move from one of the WI memory edges to the opposite host system edge. The data can flow along either axis.

Figure 2:
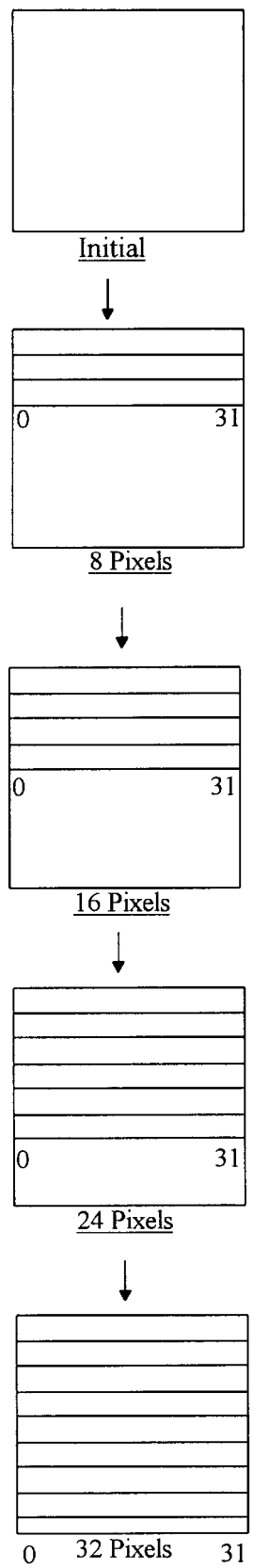
FIG. 2 is a diagramatic view illustrating the data structure within the shift matrix as a first row of 32 pixel values is written.

To load the chip with data, the host system performs a series of writes to the world interface 1. FIG. 2 shows the data structure within the shift matrix as a first row of 32 pixel values is written. The data is being shifted into the matrix from the top edge. Each horizontal line represents the bits of a single pixel value, with the least significant bit on the left. The clear regions of the matrix indicate areas which do not yet contain pixel data.

After the first row is written the matrix contains 32 pixel values of 32 bits each. The least significant bit of each pixel is located on the left of the matrix, and the most significant bit of each pixel is located on the right of the matrix. The matrix is completely filled with pixel data at this point.

Figure 3:
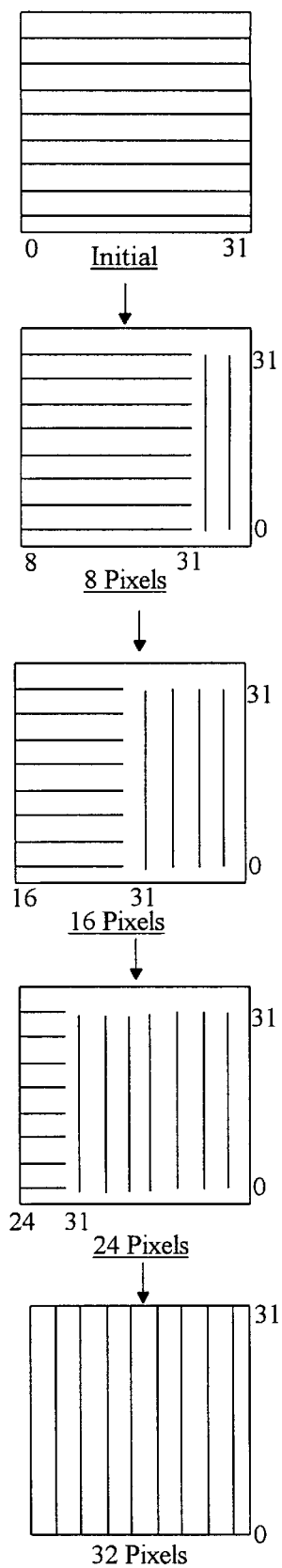
FIG. 3 is a diagramatic view illustrating the data structure within the shift matrix as a second row of 32 pixel values is written.

FIG. 3 shows the data structure within the shift matrix as a second row of 32 pixel values is written. The data is being shifted into the matrix from the right edge. Each vertical line represents the bits of a single pixel value, with the least significant bit at the bottom. The horizontal lines represent the bits associated with pixels from the first row that are being shifted out of the matrix as the second row is shifted in.

As the second row of data is shifted into the matrix pixel by pixel, the first row of data is shifted out of the matrix one bit at a time. Because of the change in shift direction between rows the least significant bit of row one is shifted out, followed by the next bit, and so on through the most significant bit of the row.

Figure 4:
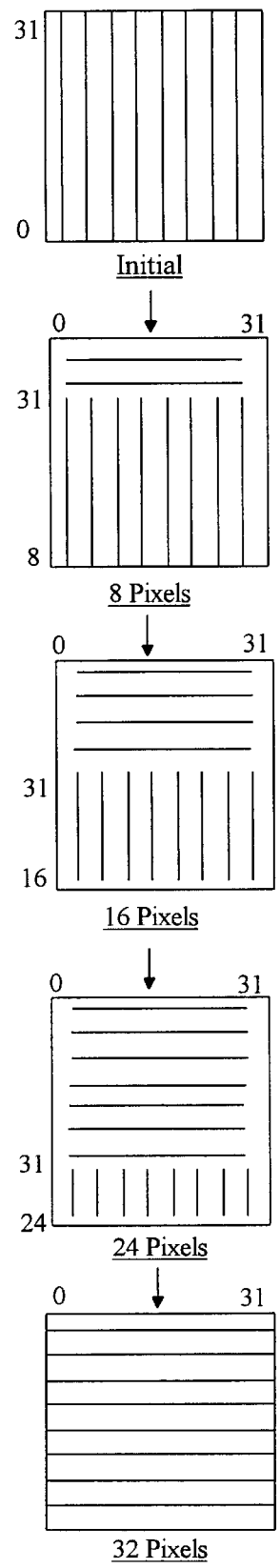
FIG. 4 is a diagramatic view illustrating the data structure within the shift matrix as a third row of 32 pixel values is written.

FIG. 4 shows the data structure within the shift matrix as a third row of 32 pixel values is written. The data is being shifted into the matrix from the top edge. Each horizontal line represents the bits of a single pixel value, with the least significant bit at the left. The vertical lines represent the bits associated with pixels from the second row that are being shifted out of the matrix as the third row is shifted in.

As the third row of data shifted into the matrix pixel by pixel, the second row of data shifted out of the matrix one bit at a time. Because of the change in shift direction between rows the least significant bit of row two was shifted out, followed by the next bit, and so on through the most significant bit of the row.

The pattern outlined above continues until the host system has written all rows of data to the world interface 1. After each row is written the direction the matrix shifts changes so that the previous row is shifted out one bit at a time as the new row is shifted in one pixel at a time.

At the beginning of the load operation the shift matrix does not contain valid pixel data, so the output of the matrix is ignored until after the first row has been written. At the end of the load operation the shift matrix contains all the pixel data for the last row, so a series of 32 writes is performed to "flush" the contents of the shift matrix into WI memory. Data coming out of the shift matrix lags that coming in by one row of pixels, the size of the data "pipe."

As each row of data is shifted out of the matrix in bitwise fashion it is loaded into WI memory. The memory is addressable by PE row and pixel bit. Each location holds 32 bits, the size required to store pixel bit N of a given row. The cornerturn logic 3 increments a bit counter each time a bit is stored, and a row counter each time a row is stored. As each row is written to the world interface 1 the previous row is being transferred from the shift matrix to WI memory, resulting in full utilization of the shift matrix during cornerturn operations.

The read process in the preferred embodiment is the reverse of what has been discussed above. The shift matrix is initially empty, so a series of 32 reads is performed to "prime" the shift matrix with data from WI memory. After each row is read the direction the matrix shifts changes so that the previous row is shifted out one pixel at a time as the new row is shifted in one bit at a time. Once again, cornerturn logic takes care of incrementing row and bit counters as WI memory is read into the shift matrix.

Access through the world interface 1 is described as "memory-like" because, for example, an array of chips can be treated like a bank of memory in that data can be transferred to or from them, with use of world interface control signals, in a raster scan fashion as if they were a bank of memory. Programmed I/O or DMA capabilities such as those found on host processors (e.g., the TI TMS320C40) or bus interfaces (e.g., the AMCC S5933 PCI controller chip) may be used to load or unload the array with minimal glue logic. Access through the world interface 1 is not exactly the same as memory because of the necessary prime and purge operations, and because access to the PE's is not random. In practice neither of these issues presents a significant problem.

FIG. 1 shows that WI memory resides between the cornerturn logic 3 and the array of PE's in the SIMD processor chip. In the preferred embodiment, WI memory is the source or destination for data in cornerturn operations and the source or destination for on-chip paging operations by the PE's. The data stored in WI memory is in bitplane format, the format naturally used by the PE's for computation.

WI Memory has two interfaces: one for cornertum logic, another for PE's. WI memory is divided into two banks, one for each interface. This allows concurrent use of both banks. The host system provides a bank select input to the world interface 1 that determines which bank is associated with each interface. The host system can change the bank select input to change which bank is addressed by each interface. This allows the two interfaces to effectively exchange data with one another, thus providing the host system with a mechanism for performing I/O operations.

The bank of memory addressed by the cornerturn logic 3 is referred-to herein as the "World Interface Bank", or "WI Bank." The bank of memory addressed by the PE's is referred-to herein as the "Page Buffer Bank", or "PB Bank." Each bank preferably can hold 128 bitplanes of data (i.e. 128 bits for each of the 32 rows and 32 columns of PE's) but is accessed in a different manner, as is set forth in more detail below.

The world interface 1 in the preferred embodiment has a data path which is 32 bits in width. This means that 32 bit pixel values are transferred to and from PE's during I/O operations. Because I/O operations are performed in increments of 32 bits, the WI bank is divided into four "pages" of 32 bitplanes. Each page can store a 32 bit pixel for each of the PE's in the array. Up to four of these 32 bit images can be transferred in a bank select switch operation, and less than four may be transferred with no performance penalties.

The pages of the WI bank are preferably accessed sequentially during I/O operations. This means that during a write operation each PE will be supplied with a pixel for the first page before any PE is supplied with a pixel for the second page. All pages are handled the same way for both read and write operations. A page index keeps track of the current page. The index is reset when a switch from read to write, or write to read, is detected by the world interface logic.

Access within a given page is as discussed above regarding storing of shift matrix output. The memory is addressed by PE row and pixel bit. Counters increment through the data by pixel bit, then by PE row to build up bitplanes in WI memory or feed the cornerturn logic 3 with data to produce pixel values.

The organization of the PB bank is different from the WI bank. The data unit addressed in the PB bank is a bitplane (i.e. one bit for each of the 32 rows and 32 columns of PE's). The current bitplane is indicated by a PB pointer which contains an index into the PB bank.

Once a bitplane is selected one of three paging operations can be performed on it. When the bitplane is read into PE working memory the operation is known as a "page-in." When PE working memory is written to the bitplane the operation is known as a "page-out." When the bitplane is swapped with PE working memory the operation is known as a "page-swap."

The PB pointer is incremented after each paging operation. When the PB pointer reaches the end of the PB bank it rolls over to the first location. A bank select switch by the host system resets the pointer to the first location in the bank. The host system can set the pointer to any value by supplying a bitplane index and "load pointer" signal to the world interface logic.

A data path 15 from the PB bank provides the PE with access to the value of the current PB bitplane as indicated by the PB pointer. The data path out of the PE is through a paging register which can be loaded with values to write to the current PB bitplane. All I/O operations preferably take place through the PB.

While the invention has been particularly shown and described with reference to a preferred embodiment thereof, it will be understood by those skilled in the art that various changes in form and details may be made therein without departing from the spirit and scope of the invention. Non-limiting examples are as follows:

The world interface can be implemented as individually addressable shift registers.

The world interface can be implemented as direct addressing of WI memory by the host system, writing full pixel values with no cornerturn logic.

The world interface can be implemented to allow partial load or unload of an array.

The world interface can be implemented to allow images smaller than the data path width to be loaded and unloaded faster (i.e. half the size loads twice as fast because two pixels are loaded with each write).

The WI memory can be implemented with a different number of bitplanes of memory, or by organizing the memory into a different number of banks.

The comerturn logic can be implemented such that either the most significant or least significant bits of pixel values are shifted out of the shift matrix first.

The cornerturn logic can be implemented such that it does not make full use of the shift matrix during cornerturn operations.

The cornerturn logic can be implemented as a discrete device separate from the chips which contain the PE's.

The cornerturn logic can be implemented to support I/O operations with various types of SIMD or other processors such as MIMD processors.

The invention according to its preferred embodiment greatly simplifies the I/O architecture of systems which incorporate bit-serial SIMD processors. However the cornerturn logic can be implemented to support I/O operations with processors which are not bit-serial (i.e. n-bit ALU).

The cornerturn logic can be implemented to convert data on a column-by-column basis rather than a row-by-row basis.

The cornerturn logic can be implemented with dimensions other than a 32 bit wide data path and 32 PE rows.

What is claimed is:

1. A memory-like I/O system for interfacing a processing element array with a host system, comprising:
   cornerturn hardware for converting data written to said processing element array from horizontal format to vertical format and for converting data read from said processing element array from vertical format to horizontal format;
   addressable interface memory, further comprising:
      means for receiving and storing first data which has been output from said cornerturn hardware and outputting said first data for delivery to said processing element array; and,
      means for receiving and storing second data which has been output from said processing element array and outputting said second data for delivery to said cornerturn hardware.

2. The I/O system according to claim 1, wherein said cornerturn hardware comprises a shift matrix.

3. The I/O system according to claim 1, wherein said cornerturn hardware and said interface memory comprise means for transferring data to or from said processing element array, with the use of interface control signals, in a raster scan fashion.

4. The I/O system according to claim 1, wherein said addressable interface memory comprises memory which is addressable by processor-element-row and pixel bit.

5. The I/O system according to claim 1, wherein said cornerturn hardware and said interface memory comprise means for performing I/O operations concurrently with processing operations by said processing element array.

6. The I/O system according to claim 1, wherein said processing element array comprises a bit-serial SIMD processor.

7. A memory-like I/O system for interfacing a processing element array with a host system, comprising:
   cornerturn logic for converting data written to said processing element array from horizontal format to vertical format and for converting data read from said processing element array from vertical format to horizontal format;
   addressable interface memory, further comprising:
      means for receiving and storing first data which has been output from said cornerturn logic and outputting said first data for delivery to said processing element array; and,
      means for receiving and storing second data which has been output from said processing element array and outputting said second data for delivery to said cornerturn logic,
   wherein said means for receiving and storing first data comprises a first bank of memory addressable by said cornerturn logic and wherein said means for receiving and storing second data comprises a second bank of memory addressable by said processing elements array.

8. An addressable interface memory for providing on-chip paging and facilitating I/O between a processing element array and a host system, comprising:
   first addressable memory for receiving and storing first data and outputting said first data for delivery to said processing element array; and,
   second addressable memory for receiving and storing second data which has been output from said processing element array and outputting said second data for use by said host system, said second addressable memory comprising means for receiving and storing paged data from at least one processing element in said processing element array and for delivering said paged data back to said at least one processing element in said processing element array.

9. The addressable interface memory according to claim 8, wherein said first addressable memory comprises a first bank of memory addressable by said host system and wherein said second addressable memory comprises a second bank of memory addressable by said at least one processing element.

10. An addressable interface for facilitating I/O between a processing element array and a host system, comprising:
   first addressable memory for receiving and storing first data in vertical format and outputting said first data for delivery to said processing element array; and,
   second addressable memory for receiving and storing second data in vertical format which has been output from said processing element array and outputting said second data for delivery to means for converting said second data in vertical format to third data in horizontal format.

11. The addressable interface according to claim 10, wherein said first addressable memory comprises a first bank of memory which interfaces with said processing element array and said second addressable memory comprises a second bank of memory which interfaces with said means for converting.

12. The addressable interface according to claim 11, further comprising:
   means for receiving a bark select input and for causing, in response thereto, said first bank of memory to be selected for interfacing with said means for converting and said second bank of memory to be selected for interfacing with said processing element array.

13. The addressable interface according to claim 10, wherein said data in vertical format comprises data which has been output by cornerturning means.

14. The addressable interface according to claim 10, wherein said means for converting said second data in vertical format to third data in horizontal format comprises cornerturning means.

15. A method for converting a word size of a host system having a first processor to a word size usable by a second processor, comprising:
   using cornerturn hardware to read sequentially data associated with a pixel;
   using said cornerturn hardware to convert said data associated with a pixel from horizontal format to vertical format;
   sequentially writing data associated with a bit row to memory;
   receiving said data associated with a bit row in said second processor; and,
   sequentially reading into said memory data associated with a bit plane from said second processor.

* * * * *